March 2, 1937.  H. C. NEUMAN  2,072,124
FERTILIZER SPRAY
Filed May 7, 1936
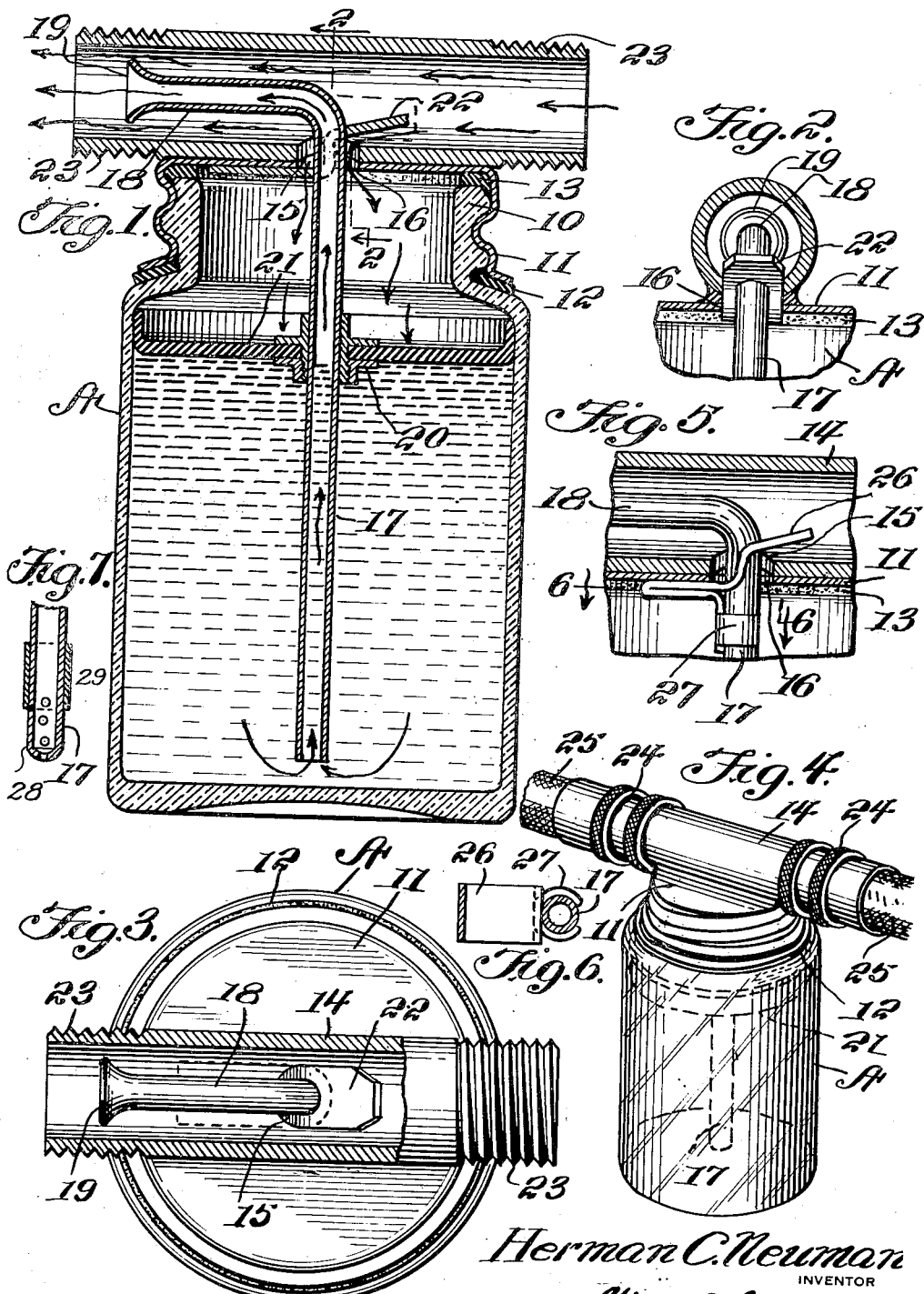
Herman C. Neuman
INVENTOR
BY Victor J. Evans & Co.
ATTORNEYS
WITNESS J. T. L. Wright Patented Mar. 2, 1937

2,072,124

UNITED STATES PATENT OFFICE 2,072,124

FERTILIZER SPRAY

Herman C. Neuman, Dearborn, Mich.

Application May 7, 1936, Serial No. 78,459

3 Claims. (Cl. 299—85)

The invention relates to a sprinkler or spraying device and more especially to a fertilizer spray device.

The primary object of the invention is the provision of a device of this character, wherein a fertilizer solution commingled with a water flow for the purposes of supplying the fertilizer to a lawn or flower or vegetable garden during the watering thereof and with minimum effort and mess and with the positive assurance of not having harmful results in that a proper mixture of both the water and solution of fertilizer of required constituency will be assured.

Another object of the invention is the provision of a device of this character, wherein the construction thereof is novel in its entirety and is adaptable for connection with a water flow line such as a hose used for watering lawns or flower or vegetable gardens and the fertilizer reduced to a solution and commingled with the flow when watering.

A further object of the invention is the provision of a device of this character, wherein means is afforded for dissolving and for spraying of commercial fertilizer or the like during the watering of a garden, lawn, etc.

A still further object of the invention is the provision of a device of this character, which is simple in its construction, automatic in the working thereof, thoroughly reliable and efficient in its operation, strong, durable, readily and easily attached to and removed from a water spray conduit or hose and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a vertical sectional view through the device constructed in accordance with the invention.

Figure 2 is a fragmentary sectional view on the line 2—2 of Figure 1 looking in the direction of the arrows.

Figure 3 is a top plan view partly in horizontal section.

Figure 4 is a perspective view of the device connected with the hose.

Figure 5 is a fragmentary vertical sectional view showing a slight modification.

Figure 6 is a sectional view on the line 6—6 of Figure 5 looking in the direction of the arrows.

Figure 7 is a fragmentary vertical sectional view through the leg of the delivery pipe and showing a slight modification thereof.

Similar reference characters indicate corresponding parts throughout the several views in the drawing.

Referring to the drawing in detail, the device comprises a receptacle A which may be a glass jar having a contracted externally threaded open mouth 10 for accommodating a screw cap or closure 11, there being associated with the mouth and cap or closure rubber gaskets 12 and 13, respectively, for the sealing of the cap or closure upon the receptacle to render it fluid tight at the cap or closure.

Built upon the cap or closure 11 is a short run of tubing 14 constituting a water flow conduit and at the lowermost portion of such tubing midway of its ends is an opening 15 registering with an opening 16 centrally of the cap or closure 11 so that communication is had between the conduit and the said receptacle A when wearing the cap or closure 11.

Extended downwardly through the opening 10 and cap 11 into the receptacle A is the vertical leg 17 of a delivery pipe while extended within the tubing 14 centrally thereof in the direction of flow therethrough is the right angular discharge leg 18 of this delivery pipe, the leg 18 at its free end being formed with a flared open terminal 19. The delivery pipe in its cross sectional diameter is considerably less than the diameter of the openings 15 and 16 so that flow created through the tubing 14 will have passage through these openings 15 and 16 into the receptacle A about the delivery pipe for a purpose presently described.

The leg 17 extends in close proximity to the bottom of the receptacle and the content of such receptacle which is a fertilizer solution is discharged or delivered from said receptacle through the delivery pipe constituted by the legs 17 and 18, respectively, for commingling with the water flow in the tubing 14 when set up therein.

Slidably fitted on the leg 17 of the delivery pipe through the means of a two-part hub 20 is a follower piston 21 preferably made from relatively soft and pliable material, as for example, rubber, and this piston is adapted to float upon the surface of the fertilizer solution content in the receptacle A. The spraying is had through pressure from the water flow through the tubing 14 when a part of such flow passes through the openings 15 and 16 above the piston 21. A downward pressure is exerted upon the piston 21 within the receptacle A causing the fertilizer solution to be forced under this presure upwardly through the delivery pipe constituted by the legs 17 and 18 and the discharge of this solution for commingling with the water flow through said tubing 14.

The cap 11 has formed therewith a deflector tongue 22 which is bent upwardly through the openings 15 and 16 to be disposed at an inclination within the tubing 14 and the purpose of this tongue is to deflect a portion of the flow through the tubing 14 into the receptacle through the openings 15 and 16 so that this partially deflected flow will exert pressure upon the piston 21 for the working thereof.

The tubing at opposite ends is externally threaded at 23 for detachable coupling of coupling collars or sleeves 24. These collars are worn by hose sections 25 ordinarily used for watering purposes in wetting lawns, gardens or the like. It is to be understood that the water supply passing through the hose is under pressure and a portion of this flow of water when the device is attached to the hose will be deflected into the receptacle A for operating the piston 21 to disperse the fertilizer solution content of this receptacle. The solution intermingles with the water flow through the tubing 14 while the hose is in use for watering purposes and in this manner proper fertilizing of the lawn or garden will be assured during the watering period.

In Figures 5 and 6 of the drawing there is shown a slight modification wherein the deflector member 26 has the clip 27 engageable with the leg 17 of the delivery pipe whereby this deflector member 26 can be worn thereby and properly positioned thereon for deflecting a part of the water flow into the receptacle A for the purposes hereinbefore set forth.

In Figure 7 of the drawing there is shown a further modification wherein the leg 17 of the delivery pipe is formed with a perforated lower end 28 on which is slidably fitted a sleeve-like valve 29, co-acting with the perforations for regulating the flow of solution into the water stream through the said delivery pipe 17.

What is claimed is:

1. A device of the character described comprising a receptacle, a closure on said receptacle, a water flow conduit attached to said closure and having communication with the receptacle, a delivery pipe extended into the receptacle and into the conduit through said communication thereof with the receptacle, and a piston working upon said delivery pipe within the receptacle and operated by pressure from a portion of the flow through said conduit for dispersing fertilizer solution content within the receptacle through the delivery pipe.

2. A device of the character described comprising a receptacle, a closure on said receptacle, a water flow conduit attached to said closure and having communication with the receptacle, a delivery pipe extended into the receptacle and into the conduit through said communication thereof with the receptacle, a piston working upon said delivery pipe within the receptacle and operating by pressure from a portion of the flow through said conduit for dispersing fertilizer solution content within the receptacle through the delivery pipe, and threaded ends on said conduit.

3. A device of the character described comprising a receptacle, a closure on said receptacle, a water flow conduit attached to said closure and having communication with the receptacle, a delivery pipe extended into the receptacle and into the conduit through said communication thereof with the receptacle, a piston working upon said delivery pipe within the receptacle and operating by pressure from a portion of the flow through said conduit for dispersing fertilizer solution content within the receptacle through the delivery pipe, threaded ends on said conduit, and a deflector at the point of communication of the conduit with the receptacle for diverting a portion of the flow from said conduit into the receptacle for its pressure upon the piston.

HERMAN C. NEUMAN.